(12) United States Patent
Mizutani (10) Patent No.: US 8,139,267 B2
(45) Date of Patent: Mar. 20, 2012

(54) METHOD, APPARATUS AND PROGRAM FOR CREATING A THRESHOLD VALUE MATRIX

(75) Inventor: Toshiyuki Mizutani, Hino (JP)

(73) Assignee: Konica Minolta Holdings, Inc., Tokyo (JP)

( * ) Notice: Subject to any disclaimer, the term of this patent is extended or adjusted under 35 U.S.C. 154(b) by 846 days.

(21) Appl. No.: 12/135,324

(22) Filed: Jun. 9, 2008

(65) Prior Publication Data

US 2008/0309983 A1 Dec. 18, 2008

(30) Foreign Application Priority Data

Jun. 15, 2007 (JP) ................. 2007-158339

(51) Int. Cl.
*G06K 15/02* (2006.01)
*G06T 5/00* (2006.01)
*H04N 1/40* (2006.01)

(52) U.S. Cl. ....... 358/3.21; 358/1.2; 358/3.03; 358/3.26

(58) Field of Classification Search ............. 358/1.2, 358/1.9, 3.01, 3.03, 3.05, 3.06, 3.13, 3.14, 358/3.19, 3.21, 3.22, 3.26
See application file for complete search history.

(56) References Cited

U.S. PATENT DOCUMENTS

| 5,111,310 A | 5/1992 | Parker et al. |
| 6,476,934 B1 * | 11/2002 | Ilbery et al. ............ 358/3.04 |
| 2007/0109604 A1 * | 5/2007 | Marumoto ............. 358/3.13 |

FOREIGN PATENT DOCUMENTS

| JP | 2001-28685 A | 1/2001 |
| JP | 2001-111829 A | 4/2001 |

OTHER PUBLICATIONS

Floyd, Robert W. et al, "An Adaptive Algorithm for Spatial Greyscale", Proceeding of the S.I.D. vol. 17/2 Second Quarter 1976, pp. 75-77.

Ulichney, Robert, "Digital Halftoning", The MIT Press, Cambridge, Massachusetts, London, England, pp. 233-331, (1987).

* cited by examiner

*Primary Examiner* — James A Thompson
(74) *Attorney, Agent, or Firm* — Holtz, Holtz, Goodman & Chick, PC (57) ABSTRACT

In a first process, initial dot pattern of a predetermined dot rate "a" is created in a first process, and a gradation value corresponding to the dot rate "a" is arranged as a threshold value in the position of the pixel of the threshold value matrix corresponding to the initial dot pattern. Then in a second process, the initial dot pattern or the dot pattern having occurred prior to the second computation is used as the dot pattern of dot rate "b", and new dots including the dots of the dot pattern of dot rate "b" is generated or any of the dots is removed from the dot pattern of the dot rate "b" by the error diffusion method. Thus, the dot pattern of the next dot rate "b'" with its dot rate having been increased or decreased in the aforementioned procedure is generated.

15 Claims, 8 Drawing Sheets

DOT PATTERN P (g) IN
GRADATION VALUE b

APPLICATION OF
GAUSSIAN FILTER
P'(g)=Gaussiann[P(g)]

ERROR DIFFUSION BY
INPUT VALUE g+δg

REFERENCE PATTERN
GRADATION VALUE g

PATTERN
GRADATION VALUE g+δg

INPUT IMAGE THRESHOLD VALUE MATRIX OUTPUT IMAGE

FIG. 12 (a)

REGULAR INITIAL PATTERN

FIG. 12 (b)

INITIAL PATTERN USING ERROR DIFFUSION

INITIAL PATTERN
GRADATION VALUE g

ERROR DIFFUSION BY
INPUT VALUE g - δg →

FIG. 14 (b)

PATTERN
GRADATION VALUE g - δg

FIG. 15

METHOD, APPARATUS AND PROGRAM FOR CREATING A THRESHOLD VALUE MATRIX

CROSS-REFERENCE TO RELATED APPLICATION

The present application is based on Japanese Patent Application No. 2007-158339 filed with Japan Patent Office on Jun. 15, 2007, entire content of which is hereby incorporated by reference.

BACKGROUND

1. Field of the Invention

The present invention relates to a method, apparatus and program for creating a threshold value matrix wherein the threshold value matrix used in quantization of the n-value signal in each pixel to an m-value (n>m>1) is created by a computation device using dither process.

2. Description of Related Art

The image outputting device is exemplified by a printer using an inkjet method or electrophotographic process, and an image output device using the area modulation such as a liquid crystal display. In such an image output device, what is called half-tone processing is applied to an input image, and a gray scale image is converted into the area-modulated image. This process is typically represented by the "error diffusion method" and dither process".

The principle of the error diffusion method is introduced in R. W. Floyd and L. Steinberg "An Adaptive Algorithm for Spatial Gray Scale", SID 75 Digest (1976). As described in this document, a step is taken to compute the difference in density (error data) between the density of each pixel of interest of input image, and the output pixel density (dot on/off status) outputted from a recording apparatus after halftone processing. Halftone processing is carried out while the error data as a result of computation is distributed wherein a specific weight is assigned to the peripheral pixel before halftone processing.

In the dither process, by contrast, comparison is made between the density of each pixel of interest of input image and the threshold value corresponding thereto, and a decision is made to see whether or not the dot of the pixel of interest is turned on. The threshold value is held as the matrix, and the dot pattern produced by the dither process is determined by the threshold value matrix.

As will apparent from the above, halftone processing speed is higher in the dither process than in the error diffusion method However, the error diffusion method provides more uniform dot distribution, hence a high-quality image.

In one of the techniques disclosed in recent years, the pattern of the threshold value matrix used in the dither process is improved to get the dot pattern as that obtained from the error diffusion method. A proposal of the implemented device is found in the U.S. Pat. No. 5,111,310 (Patent Document 1). The Specification of this patent discloses the quantization art of implementing the error diffusion-like halftone reproduction wherein, while the high-speed processing on the equal level as that of the conventional dither process in terms of halftone processing is maintained by using a sufficiently large threshold value matrix, the matrix is assigned with the pattern showing the space frequency characteristic known under the name of blue noise, whereby error diffusion-like halftone reproduction is achieved (hereinafter referred to as "blue noise dither process").

The details of the blue noise dither process are disclosed in a great number of documents including "Digital Halftoning" Robert Ulichney (The MIT Press Cambridge, Massachusetts London, England). The blue noise dither process is the halftone technique using the threshold value matrix wherein the noise of the output image is reduced by suppressing the power spectrum of the low-frequency component highly sensitive to the human eyesight.

Several other techniques are disclosed in the following Patent Documents:

[Patent Document 1] U.S. Pat. No. 5,111,310 (FIG. 1, P1)

[Patent Document 2] Japanese Unexamined Patent Application Publication No. 2001-28685 (Tokkai) (FIG. 1, P1)

[Patent Document 3] Japanese Unexamined Patent Application Publication No. 2001-111829 (Tokkai) (FIG. 1, P1)

The Patent Document 1 is the basic patent of the blue noise mask. The image re-created through a bypass filter after the FFT operation of the random pattern is compared with the original image, and the pixel of greater error is reversed.

The Patent Document 2 shows the method of reducing the threshold value matrix creation process. The area is divided into small areas, and a halftone matrix is formed in each small area. Then combination is made in the final phase.

Further, the Patent Document 3 describes the method wherein setting is made in such a way that the initial dot pattern is formed in a regular triangle, to ensure that a highlight texture will not appear when a mask is created according to the blue noise mask process. The dot arrangement is also determined by using the space potential.

However, the blue noise dither process requires power spectrum to be computed many times for each gradation value. When the threshold value matrix is larger, much time is required to create the matrix. This problem has been left unsolved.

Further, in the blue noise dither process, there is a gradation area wherein a specific pattern such as a chequered pattern appears and the image quality is degraded.

SUMMARY

The object of the present invention is to solve the aforementioned problems and to provide a method, apparatus and program for creating a threshold value matrix wherein a high-quality image can be obtained by uniform dot distribution at a quick halftone processing speed.

According to one aspect of the present invention, there is provided a method of creating a threshold value matrix used for quantization of n-value signal in each pixel into m-value (n>m>1) using a dither process, by a computation device, the method including: executing a first process of creating an initial dot pattern of a predetermined dot rate "a" and arranging a gradation value corresponding to the dot rate "a" at a pixel position of the threshold value matrix, the pixel position corresponding to the initial dot pattern, as a threshold value; executing a second process of one of i) creating a next dot pattern of dot rate "b'" that is a dot rate increased by generating new dots including dots having a dot pattern of dot rate "b" based on an error diffusion method and in doing so, arranging a gradation value corresponding to the dot rate "b'" as a threshold value in a pixel position of the threshold value matrix corresponding to a position for generating each of the new dots, and ii) creating a next dot patter of dot rate "b'" that is a dot rate decreased by removing any of the dots in the dot pattern having the dot rate "b'" based on an error diffusion method; and in doing so, arranging a gradation value corresponding to the dot rate "b'" as a threshold value in a pixel position of the threshold value matrix corresponding to a position for removing any of the dots; and repeating the second process for each dot rate, wherein the initial dot pattern or the dot pattern generated in the second process having been executed one step before is used as a dot pattern of dot rate "b".

DESCRIPTION OF THE PREFERRED EMBODIMENTS

First Embodiment

The following describes the first embodiment of the present invention with reference to drawings. In the first place, a threshold value matrix creating apparatus as an embodiment of the present invention will be explained:

It should be noted that this threshold value matrix creating apparatus can be used independently, or can be loaded on an image forming apparatus for forming an image by area modulation, an image processing apparatus or an image display apparatus. It can also be operated as a threshold value matrix creating program on the computer of the image forming apparatus, image processing apparatus or image display apparatus.

Figure 1:
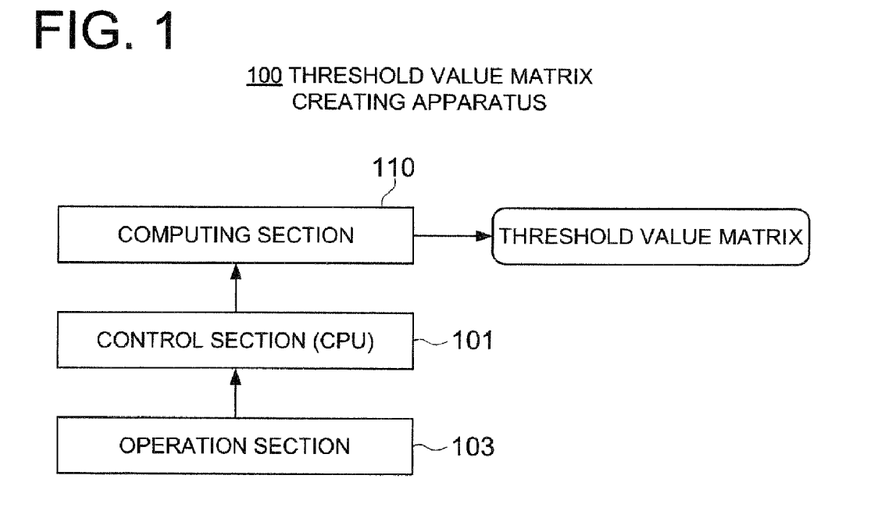
FIG. 1 is a functional block diagram showing the arrangement of a threshold value matrix creating apparatus as an embodiment of the present invention.

FIG. 1 is a block diagram showing the appropriate structure of the threshold value matrix creating apparatus 100. As illustrated, the threshold value matrix creating apparatus 100 includes a control section 101 for providing various forms of control; an operation section 103 for receiving instructions and inputs on various forms of setting; and a computing section 110 as a computation device for creating the dot pattern of each dot rate from a predetermined initial dot pattern and arranging the gradation value corresponding to each dot rate as a threshold value, whereby the threshold value matrix is determined. Thus, threshold value matrix creating program is run by the CPU 101, ROM (not illustrated) or processor constituting the computing section 110, whereby a threshold value matrix is produced.

The embodiment will be explained with reference to an specific example of creating a threshold value matrix for binarization of the image having a 8-bit gradation, i.e., a gradation of n=256 value in the range of 0 through 255. In this case, the threshold value matrix is made up of the threshold values in the range of 0 through 255.

Figure 2:
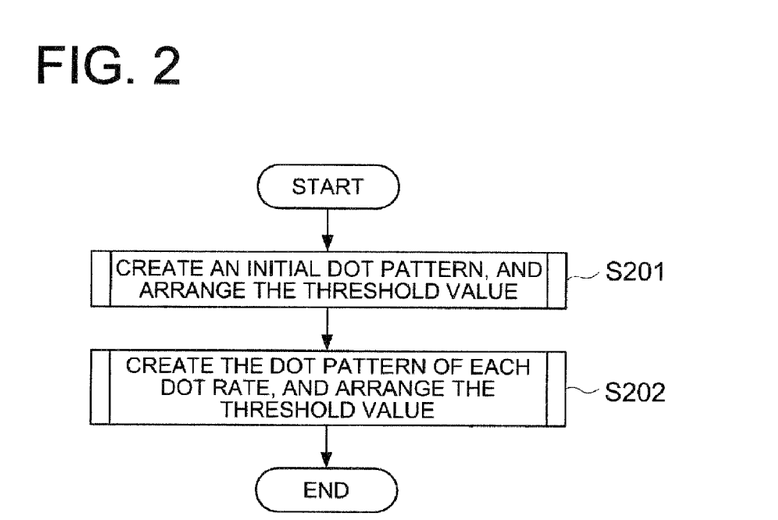
FIG. 2 is a flow chart representing the basic processing operation of the embodiment of the present invention.

FIG. 2 is a schematic flow chart showing the procedure of creating a threshold value matrix in the present embodiment.

In this embodiment, the initial dot pattern of the threshold value matrix is created from the highlight side. Accordingly, the pattern is created using an error diffusion method so that the initial dot pattern will have the dot rate of 1/255 (FIG. 3(b)).

A commonly known art can be used as the error diffusion method. Further, regular dots such as grid-like dots can also be utilized (FIG. 3(a)).

Figure 3:
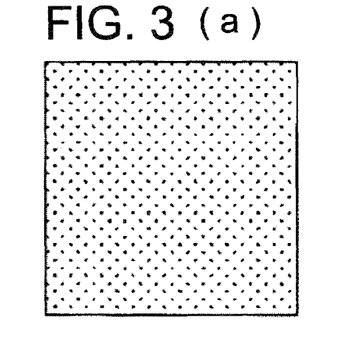
FIGS. 3(a) and 3(b) are explanatory diagrams representing an example of the initial dot pattern as a first embodiment of the present invention.

The error diffusion pattern in the initial dot pattern of the highlight side can be used to improve the connection with other gradation levels. Alternatively, an irregular pattern can be employed to improve the distribution on the highlight side In response to the gradation value, the dot of each pixel position of the initial dot pattern illustrated in FIG. 3 is replaced by the threshold value "1". The above has described the first process or the first computation (Step S201 of FIG. 2)

In the threshold value matrix creating apparatus 100 for creating the threshold value matrix to be used for quantization of the n-value signal of each pixel into the m-value (n>m>1) using the dither process, the computing section 110 creates the initial dot pattern of the threshold value matrix in the first process or first computation using the error diffusion method so as to the dot rate of 1/n. In this case, the dot rate of 1/n corresponds to the dot rate "a" of the Claim. The gradation value corresponding to the dot rate "a" is arranged as a threshold value at the pixel position of the threshold value matrix corresponds to this initial dot pattern.

This is followed by the step of referencing this initial dot pattern to create the dot pattern of other value and to determine the threshold value (Step S202 of FIG. 2.

In the second process or the second computation, the computing section 110 creates the dot pattern of the next dot rate "b'", having its dot rate increased by generating a new dot including the dot of the dot pattern having dot rate "b" using the error diffusion method wherein the initial dot pattern or the dot pattern having been generated en the previous stage of the second computation is used as the dot pattern of the dot rate "b". In this case, the gradation value corresponding to the rate "b'" is arranged as a threshold value at the pixel position of the threshold value matrix corresponding to the position for generating the dot. Further, this second computation is repeated for each dot rate, whereby the threshold value matrix is created.

Figure 4:
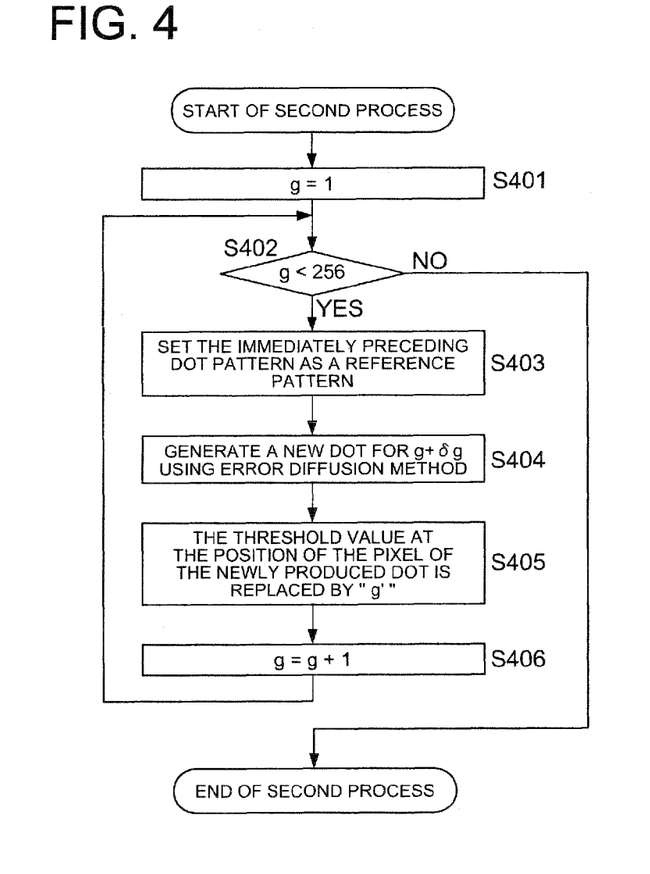
FIG. 4 is a flow chart showing the processing operation in the first embodiment of the present invention.

The flow chart of FIG. 4 illustrates the details of the functions for determining the dot pattern for each dot rate and the arrangement of the threshold value (Step S202 of FIG. 2). The description of this embodiment assumes that the gradation value corresponding to the dot rate "b" is "g", For example, if the dot rate "b" is 1/255, the gradation value corresponds to "1".

After creating the initial dot pattern in the first process, the computing section 110 sets g=1 (Step S401 of FIG. 4) in the second process and increments "g" every time the processing is repeated (Step S406 of FIG. 4) The computing section 110 creates the dot pattern of each dot rate until "g" reaches 255 (Step S402 of FIG. 4) and executes the process of arranging the threshold value.

Further, in this embodiment, a global mask pattern is formed to ensure that a fixed pattern will not appear easily at the time of repetition. In the present case, an example of creating a threshold value matrix in increments of 128×128 pixels will be shown.

Figure 5:
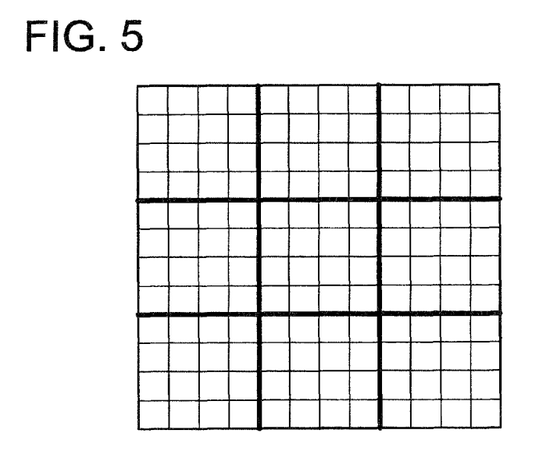
FIG. 5 is an explanatory diagram showing the dot pattern used in the processing operation of the embodiment of the present invention.

For example, as shown in FIG. 5, the pattern formed by repeating the aforementioned 128×128-pixel pattern three times along the length and across the width is assumed as the dot pattern of the reference pattern. To be more specific, the size of image in the dot pattern of the reference pattern can be expressed by a 384×384-pixel matrix.

As described above, the mask patterns copied on the top, bottom and both sides of one dither mask as a basis are rearranged, thereby suppressing the pseudo contour that is likely to appear at the juncture of the masks when the mask is repeated in the form of tiles. The reference pattern is made into a dot pattern formed by repeating the pattern of the same threshold value matrix three times or more along the length and across the width. This arrangement suppresses the interruption between dots that are likely to occur at the juncture when the threshold value matrix is repeated.

Figure 6:
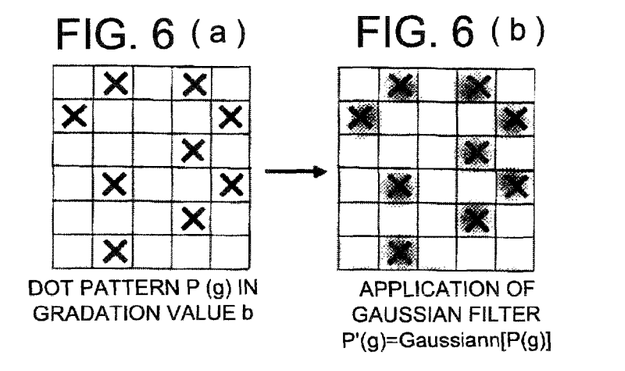
FIGS. 6(a) and 6(b) are explanatory diagrams representing the repulsion pattern used in the processing operation of the embodiment of the present invention.

Further, in the aforementioned second process, it is possible to create a repulsion potential pattern based on the dot pattern of the dot rate "b" as shown in FIG. 6 and to reflect it in the error diffusion using the method to be described later. In this embodiment, a Gaussian filter is applied to the dot pattern as the repulsion potential, but various types of convolution filters can also be used.

Figure 7:
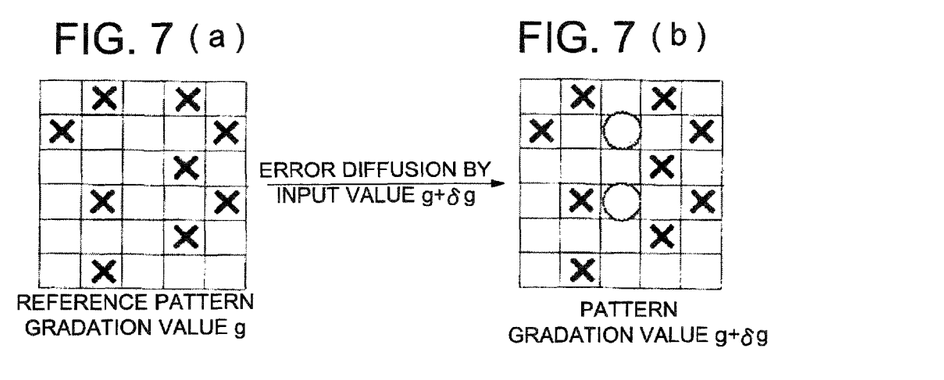
FIGS. 7(a) and 7(b) are explanatory diagrams representing the generation of a dot in the processing operation of the embodiment of the present invention.

This procedure makes it difficult for the next dot to be produced on the periphery of the dots having occurred already. This provides improved dot distribution as shown in FIG. 7. In the example of FIG. 6, the repulsion potential of Gaussian distribution is produced on the periphery of the dot at "x" so that the next dot is not allowed to occur easily at the position closest to the already existing dot.

In this case, the range of generating a repulsion potential is made variable by the density of the dots having been produced. Thus, the optimum dot distribution can be obtained by dot density.

In this case, if "g" is 1, the initial dot pattern is assumed as the reference pattern. If "g" is two or more, the dot pattern obtained from processing in the immediately proceeding second process is assumed as a reference pattern (Step S403 of FIG. 4). As shown in the Step S404 of FIG. 4, the system goes to the process of generating a new dot in the dot pattern of each dot rate. FIG. 7 is an explanatory diagram showing how a new dot is produced.

The gradation value of the dot pattern of the dot rate "b" in the reference pattern in FIG. 7(a) (left) is assumed as "g". Then error diffusion is carried out in response to the input value of g+δg, and a new dot is produced, as shown in FIG. 7(b). Assume, for example, that g=1 and δg=1. Based on the immediately preceding reference pattern g=1, error diffusion is carried out at g=2 to generate a new dot.

In this case, the dot is forcibly turned on at the time of error diffusion to ensure that the dot having been generated at g=1 will also be generated at g=2. This procedure suppresses the interruption among dots.

As described above, a new dot having an updated value of gradation value g+δg (dot rate "b'") is generated based on the reference pattern of the gradation value g (dot rate "b"). In this case, if gradation value g'=g+δg, the threshold value at the position of the dot having been newly generated with the dot pattern having a radiation value "g'" is determined as "g'" (Step S405 of FIG. 4). The aforementioned operation is repeated for all the values up to 255 (Steps S406 through S402 of FIG. 4: NO).

Figure 8:
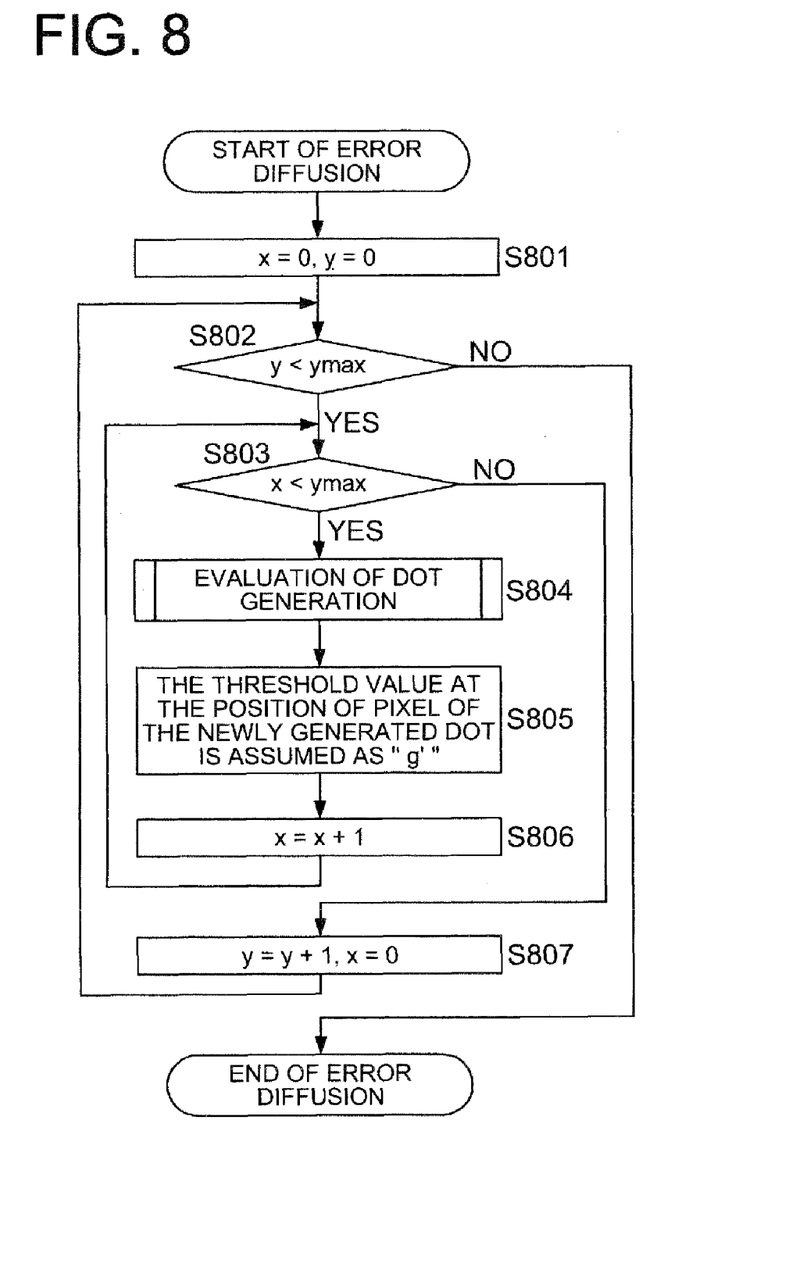
FIG. 8 is a flow chart showing the processing operation in the first embodiment of the present invention.

FIG. 8 is a flow chart giving more detailed description of the error diffusion routine (Step S404 of FIG. 4). Further, FIG. 9 is a flow chart showing the details of the routine for determining the generation of a dot in FIG. 9.

As shown in FIG. 8, in this example, the image size of the reference matrix is processed in the direction of raster, i.e., in the direction x. As described above, ymax=384 and xmax=384. To be more specific, occurrence of dots is determined sequentially (Step S804 of FIG. 8) in the direction of raster from the pixel position of x=0 and y=0 (Step S801 of FIG. 8) to the pixel position of x=max and y=max (Step S802: NO). The threshold value of the pixel position of a newly generated dot is assumed as "g'" (Step S805 of FIG. 8).

Figure 9:
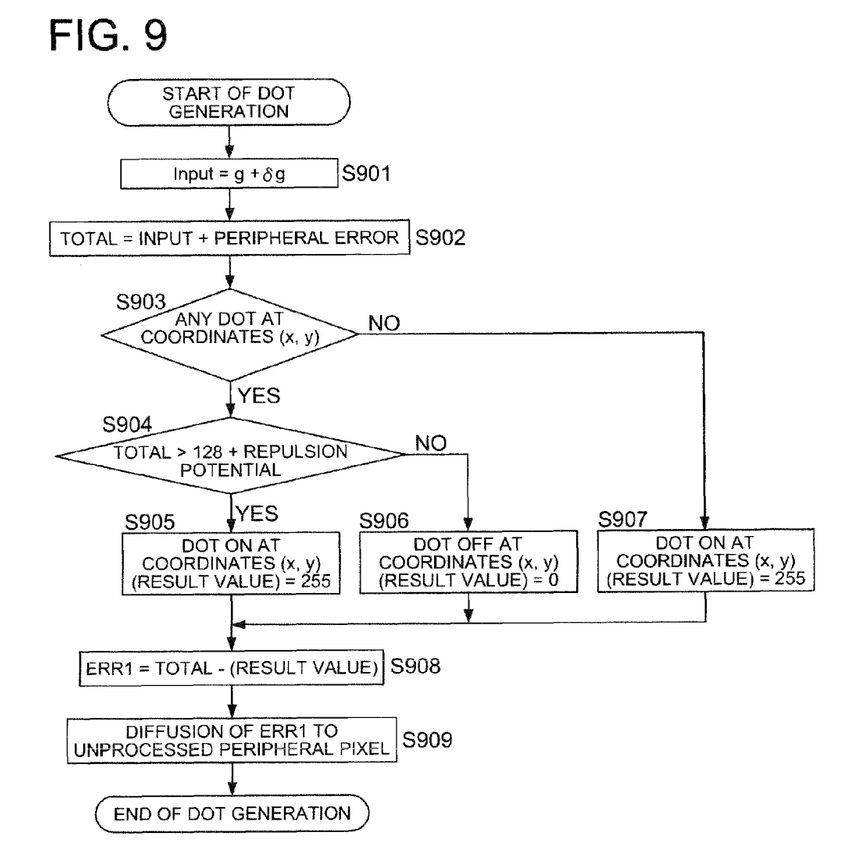
FIG. 9 is a flow chart showing the processing operation in the first embodiment of the present invention.

The flow chart of FIG. 9 shows the process of generating the dot. The input value "Input"g=δg (Step S901 of FIG. 9) and the total obtained by adding the peripheral error thereto is calculated (Step S902 of FIG. 9).

A decision is made to see whether or not a dot has already occurred at the position of the pixel of interest (Step S903 of FIG. 9). If a dot has already occurred (Step S903 of FIG. 9: NO), the dot is added to the pixel of interest and "255" is substituted into the total as a value to be evaluated (Step S907 of FIG. 9). An error between the total and the resultant value (Step S908 of FIG. 9) is found out, and is diffused into the unprocessed pixels on the periphery (Step S909 of FIG. 9).

If no dot has occurred to the pixel of interest (Step S903 in FIG. 9: YES), normal error diffusion is performed. To be more specific, the total is compared with the threshold value (128 in this case) (Step S904 of FIG. 9). If the total is greater (Step S904 of FIG. 9: YES), the dot is turned on and the evaluation value is set to 255 (Step S905 of FIG. 9). If not (Step S904 of FIG. 9: NO), the dot is turned off and the evaluation value is set to 0 (Step S906 of FIG. 9). An error between the evaluation value having occurred here and the total (Step S908 of FIG. 9) is diffused to the unprocessed pixel on the periphery (Step S909 of FIG. 9), This arrangement makes it possible to generate a dot having a gradation value g+δg, including the dot having a gradation value "g", In this example, the repulsion potential pattern is reflected in comparison between the total and threshold value (Step S904 of FIG. 9) at the time of dot evaluation. This arrangement makes it difficult for a new dot to be produced around the dots having already been produced.

Figure 10:
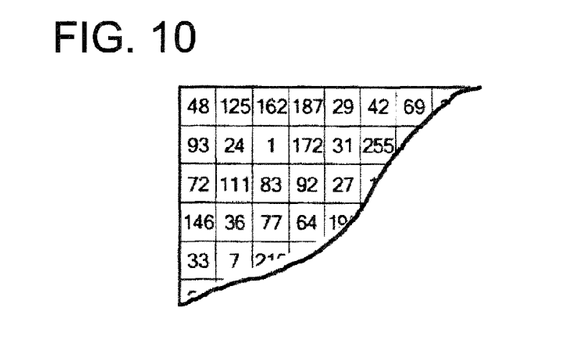
FIG. 10 is an explanatory diagram showing an example of the embodiment threshold value matrix of the present invention.

This procedure is repeated up to 255, as shown in the flow chart of FIG. 4, to provide the threshold value matrix by the threshold values from 0 through 255, as shown in FIG. 10. In this case, only part of the threshold value matrix of 384 pixels is shown as an example, for both x and y.

Figure 11:
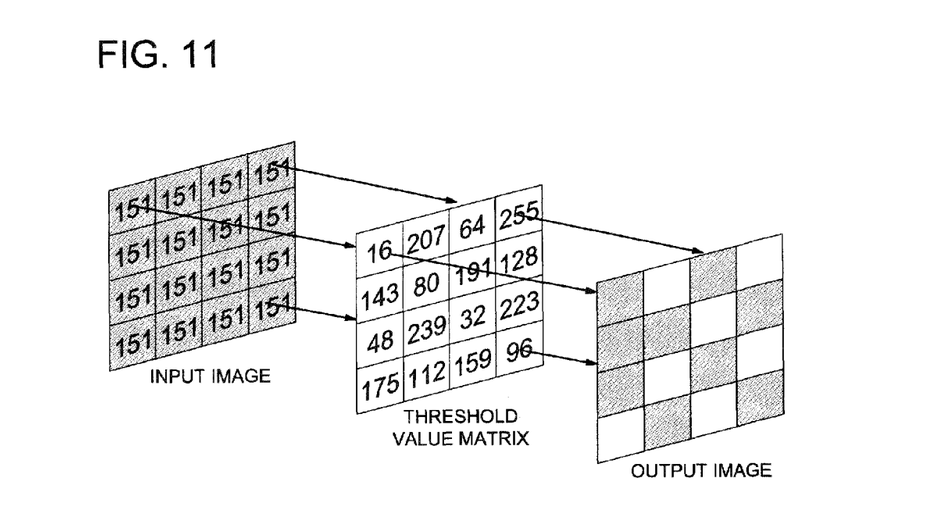
FIG. 11 is an explanatory diagram showing the image processing operation using the threshold value matrix as an embodiment of the present invention.

As shown in FIG. 11, quantization by dither process, i.e., processing of threshold value is carried out using the threshold value matrix created by the aforementioned embodiment, whereby the dot pattern of error diffusion can be reproduced in each gradation area.

As described above, in this embodiment, the initial dot pattern of a predetermined dot rate "a" is created in the first process (the first computation), and the gradation value corresponding to the dot rate "a" is arranged as a threshold value in the position of the pixel of the threshold value matrix corresponding to this initial dot pattern. Then in the second process (the second computation), the initial dot pattern or the dot pattern having occurred prior to the second computation is used as the dot pattern of dot rate "b", and a new dot including the dot of the dot pattern of dot rate "b" is generated by the error diffusion method. Thus, the dot pattern of the next dot rate "b'" with its dot rate having been increased is generated. The gradation value corresponding to the dot rate "b'" is arranged as a threshold value at the pixel position of the threshold value matrix corresponding to the position wherein dots are produced in this case. Further, this second computation is repeated for each dot rate, whereby a threshold value matrix is created, and the dot pattern of error diffusion can be obtained for each dot rate. Thus, a high-quality image is provided by using the threshold value matrix by this dot pattern.

Compared with the conventional blue noise mask creation method, the creation process is made of the error diffusion alone. This arrangement reduces the creation time. To be more specifics, when the signal of the n-value (value 256 in this case) in each pixel is quantized into the m-value (n>m>1, binary in this case) using the dither process, high-speed image processing is possible because the dither process is employed. However, since the threshold value matrix is made by error diffusion, a high-quality image can be reproduced by the error diffusion method.

Further, in the present embodiment, the threshold value matrix is created from the highlight side. Accordingly, a high-quality image resulting from the initial dot pattern of error diffusion can be reproduced on the highlight side wherein the dot rate is small and dot diffusion stands out conspicuous.

Embodiment 2

In the aforementioned first embodiment, the initial dot pattern is set to a highlight side wherein the dot rate is smaller, and the dot rate was gradually increased. This arrangement further improves the image quality on the highlight side.

By contrast, in the second embodiment, the initial dot pattern is set to the shadow side wherein the dot rate is greater, and the dot rate is gradually decreased. This arrangement still further improve the image quality on the shadow side wherein the dot rate is greater, namely, density is higher.

In this case, similarly to the case of the first embodiment, an initial dot pattern is created (Step S201 of FIG. 2) and the threshold value for each value is determined (Step S202 of FIG. 9), as shown in the flow chart of FIG. 2.

In this embodiment, the pattern of the threshold value matrix is created (Step S201 of FIG. 2) from the shadow side. Thus, the error diffusion method is used to create the pattern to ensure that the initial dot pattern will have a dot rate on the high-density side (FIG. 12(b)).

A commonly known conventional art can be used in this error diffusion method. Further, regular dots such as grid-like dots can also be utilized (FIG. 12(a)).

The error diffusion pattern in the initial dot pattern of the shadow side can be used to improve the connection with other gradation levels. Alternatively, an irregular pattern can be employed to improve the distribution on the shadow side.

Figure 13:
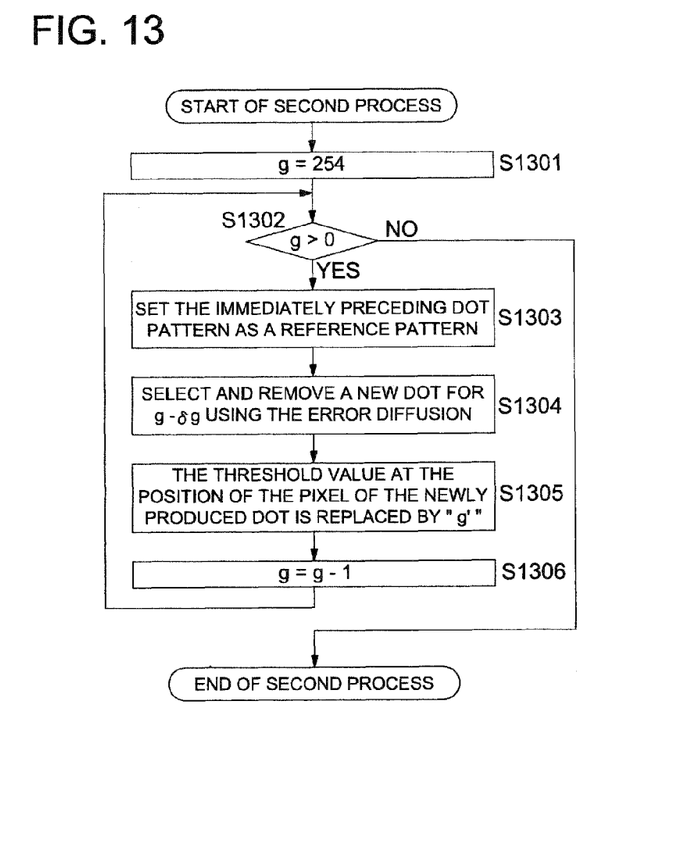
FIG. 13 is a flow chart showing the processing operation in the second embodiment of the present invention.

The flow chart of FIG. 13 illustrates the details of the functions for determining the dot pattern for each dot rate in each signal value of this embodiment and the arrangement of the threshold value (Step S202 of FIG. 2).

Figure 12:
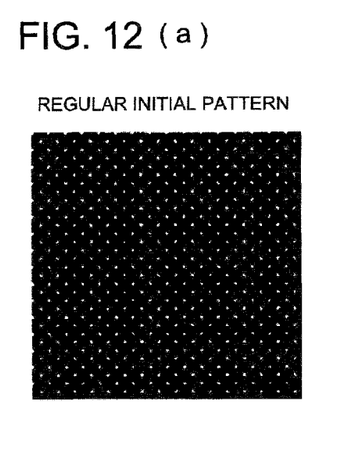
FIGS. 12(a) and 12(b) are explanatory diagrams representing an example of the initial dot pattern as a second embodiment of the present invention.

The description of the second embodiment assumes that the gradation value corresponding to the dot rate "b" is "g". The initial dot pattern of FIG. 12 is assumed to have g=254. For example, if the dot rate "b" is 254/255, the gradation value corresponds to 254.

After creating the initial dot pattern in the first process, the computing section 110 sets g=254 in the second process (Step S1301 of FIG. 13), and decrements "g" every time the processing is repeated (Step S1306 of FIG. 13). The computing section 110 creates the dot pattern of each dot rate until "g" reaches 0 (Step S1302 of FIG. 13) and executes the process of arranging the threshold value.

In this second embodiment as well, as shown in FIG. 5, the pattern formed by repeating the aforementioned 128×128-pixel pattern three times along the length and across the width is assumed as the dot pattern of the reference pattern. To be more specific, the size of image in the dot pattern of the reference pattern can be expressed by a 384×384-pixel matrix. As described above, the mask patterns copied on the top, bottom and both sides of one dither mask as a basis are rearranged. This arrangement suppresses the pseudo contour that is likely to appear at the juncture of the masks when the mask is repeated in the form of tiles.

In the second process of this second embodiment, when the repulsion potential pattern described with reference to FIG. 6, repulsion potential is generated for the dot having been removed so that a dot cannot be easily removed immediately after around the dot having been removed. This arrangement also ensures uniform dot distribution in the case of decrement.

In this case, the range of generating a repulsion potential is made variable by the density of the dots having been removed. Thus, the optimum dot distribution can be obtained by dot density.

In this case, if "g" is 254, the initial dot pattern is assumed as the reference pattern. If g" is 253 or less, the dot pattern obtained from proceeding in the second process is determined as a reference pattern (Step S1303 of FIG. 13). As shown in the Step S1304 of FIG. 13, the system goes to the process of generating a new dot in the dot pattern of each dot rate.

Figure 14:
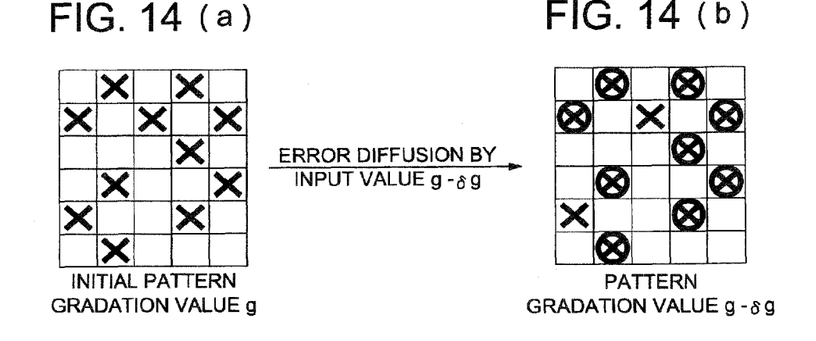
FIGS. 14(a) and 14(b) are the explanatory diagrams showing the generation of a dot in the processing operation of the embodiment of the present invention.
Figure 15:
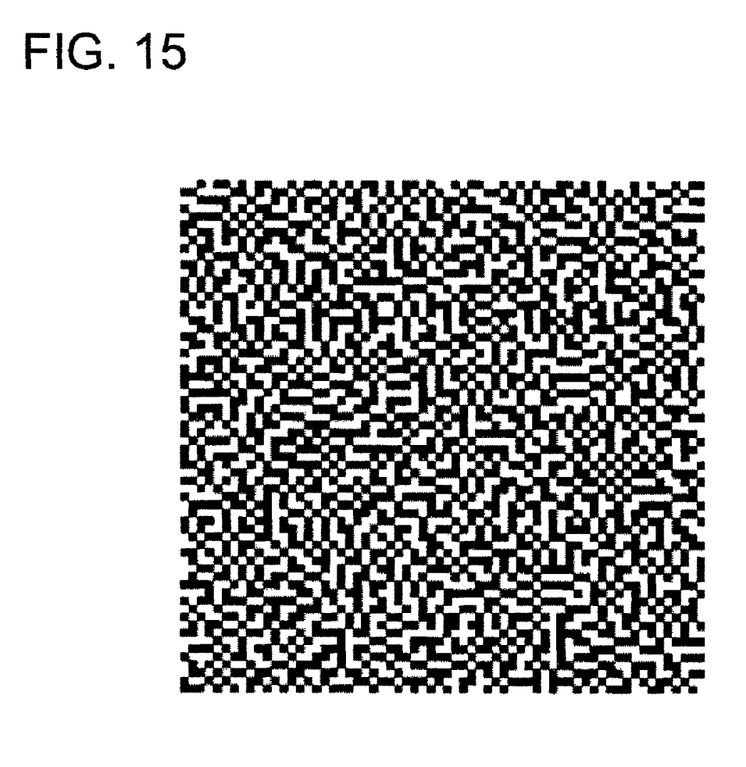
FIG. 15 is an explanatory diagram showing an example of the initial dot pattern as a third embodiment of the present invention.

FIG. 14 is an explanatory diagram showing how a new dot is selected and removed. The gradation value of the dot pattern of the dot rate "b" in the reference pattern in FIG. 14(a) (left) is assumed as "g", Then error diffusion is carried out in response to the input value of g−δg, and a new dot is selected and removed, as shown in FIG. 14(b). Assumes, for example, that g=254 and δg=1. Based on the immediately preceding reference pattern g=254, error diffusion is carried out at g=254 to generate a new dot. In this case, "x" of FIG. 14 indicates that the circled pixel is selected.

Assume that gradation value g'=g−δg. The threshold value at the position of a new dot having been produced with the dot pattern of gradation value g' is determined as "g'" (Step S1305 of FIG. 13). This operation is repeated for all values including 0 (Steps S1306 through S1302 of FIG. 13: NO).

As shown in FIG. 8 of the first embodiment, in this second embodiment, the image size of the reference matrix is processed in the direction of raster. Further, for selection and removal of a new dot, the same process of error diffusion as that described with reference to the first embodiment is executed.

As shown in the flow chart of FIG. 13, "g" is repeated down to 0. This procedure provides the threshold value matrix by threshold values of 255 through 0, as shown in FIG. 10. Using the threshold value matrix created in the aforementioned embodiment, the dot pattern of error diffusion can be reproduced in each gradation area by quantization by dither process, namely, by execution of the process of threshold value, as shown in FIG. 11.

As described above, in this second embodiment, the initial dot pattern of a predetermined dot rate "a" is created in the first process (the first computation), and the gradation value corresponding to the dot rate "a" is arranged as a threshold value in the position of the pixel of the threshold value matrix corresponding to this initial dot pattern. Then in the second process (the second computation), the initial dot pattern or the dot pattern having occurred prior to the second computation is used as the dot pattern of dot rate "b", and a dot is selected from the dots of the dot pattern of dot rate "b" and is removed by the error diffusion method, whereby the dot pattern of the next dot rate "b'" with its dot rate having been decreased is generated. The gradation value corresponding to the dot rate "b'" is arranged as a threshold value at the pixel position of the threshold value matrix corresponding to the position wherein dots are removed in this case. Further, this second computation is repeated for each dot rate, whereby a threshold value matrix is created, and the dot pattern of error diffusion can be obtained for each dot rate. Thus, a high-quality image is provided by using the threshold value matrix by this dot pattern.

Compared with the conventional blue noise mask creation method, the creation process is made of the error diffusion alone. This arrangement reduces the creation time.

To be more specific, when the signal of the n-value (value 256 in this case) in each pixel is quantized into the m-value (n>m>1, binary in this case) using the dither process, high-speed image processing is possible because the dither process is employed. However, since the threshold value matrix is made by error diffusion, a high-quality image can be reproduced by the error diffusion method.

Further, in the present embodiment, the threshold value matrix is created from the shadow side. Accordingly, a high-quality image resulting from the initial dot pattern of error diffusion can be reproduced on the shadow side wherein the dot rate is greater.

The technique described under the name of "error diffusion method" in the aforementioned description of the embodiment may be different from the commonly known conventional error diffusion method because dots are removed so as to include the dots having been generated The technique similar to the error diffusion method is referred to as "error diffusion method" in this embodiment.

Embodiment 3

In the third embodiment, the initial dot pattern is set at the intermediate value. For example, the gradation value of 128/255 likely to cause degradation of image quality is used.

On the side having a density higher than the value 128 of the initial dot pattern, a dot is generated according to FIG. 4 of the aforementioned first embodiment so that the threshold value matrix is created. Similarly, on the side having a density lower than the value 128 of the initial dot pattern, a dot is removed according to FIG. 13 of the aforementioned second embodiment so that the threshold value matrix is created.

In the third embodiment, the repulsion potential pattern is preferably reflected at the time of dot evaluation, similarly to the description with reference to FIG. 6. This arrangement also ensures uniform dot distribution in the case of both increment and decrement.

Using the threshold value matrix created in the aforementioned third embodiment, the dot pattern of error diffusion can be reproduced in each gradation area by quantization by dither process, namely, by execution of the process of threshold value, as shown in FIG. 11 already introduced.

In this third embodiment, the initial dot pattern of a predetermined dot rate "a" is created in the first process (the first computation), and the gradation value corresponding to the dot rate "a" is arranged as a threshold value in the position of the pixel of the threshold value matrix corresponding to this initial dot pattern. Then in the second process (the second computation), the initial dot pattern or the dot pattern having occurred prior to the second computation is used as the dot pattern of dot rate "b", and a new dot including the dot of the dot pattern of dot rate "b" is generated or any of the dots is removed from the dot pattern of the dot rate "b" by the error diffusion method. Thus, the dot pattern of the next dot rate "b'" with its dot rate having been increased or decreased in the aforementioned procedure is generated. The gradation value corresponding to the dot rate "b'" is arranged as a threshold value at the pixel position of the threshold value matrix corresponding to the position wherein dots are produced or removed in this case. Further, this second computation is repeated for each dot rate, whereby a threshold value matrix is created, and the dot pattern of error diffusion can be obtained for each dot rate. Thus, a high-quality image is provided by using the threshold value matrix by this dot pattern.

Compared with the conventional blue noise mask creation method, the creation process is made of the error diffusion alone. This arrangement reduces the creation time.

To be more specific, when the signal of the n-value (value 256 in this case) in each pixel is quantized into the m-value (n>m>1, binary in this case) using the dither process, high-speed image processing is possible because the dither process is employed. However, since the threshold value matrix is made by error diffusion, a high-quality image can be reproduced by the error diffusion method.

Further, in the present embodiment, the threshold value matrix is created from the intermediate-density side to the high- and low-density sides. Accordingly, a high-quality image resulting from the initial dot pattern of error diffusion can be reproduced on the half-tone side wherein the dot rate is intermediate and dot-to-substrate contrast is less conspicuous.

In the description of the aforementioned embodiment, the dot has occurred or has been removed so as to include the dot having occurred already in this embodiment, and therefore, the method described with reference to the "error diffusion method" may be different from the conventionally known general error diffusion method. In this embodiment, the art similar to the error diffusion method as described above is described under the name of the "error diffusion method".

Embodiment 4

In the aforementioned third embodiment, the value for creating this initial dot pattern is set to the intermediate of all the values. Furthermore, the value desired by the user can be set using the operation section 103.

It is possible to set various parts such as the part of the signal value included in the greatest amount in the image reproduced, the signal value for the part which the user is interested in, and the signal value for the part corresponding to the human skin color.

Embodiment 5

The aforementioned first through fourth embodiments are applicable not only to the formation of the monochromatic image but also to the formation of the threshold value matrix for color image formation. In this case, they are also applicable to the threshold value matrix of each of colors R, G and B or Y, M, C and K.

[Supplements]

The invention described below is further aspects of the present invention:

[Supplement 1]

A threshold value matrix creating method of creating the threshold value matrix for quantization of the input gradation value of the n-value in each pixel to m-value (n>m>1) using the dither process, wherein the aforementioned threshold value matrix determines the threshold value using the error diffusion method while increasing the output density, and the aforementioned error diffusion method generates a dot at the output pixel position having been determined previously.

[Supplement 2]

A threshold value matrix creating method of creating the threshold value matrix for quantization of the input gradation value of the n-value in each pixel to m-value (n>m>1) using the dither process, wherein the aforementioned threshold value matrix determines the threshold value using the error diffusion method while decreasing the output density, and the aforementioned error diffusion method generates a dot by selection from the output pixel position having been determined previously.

[Supplement 3]

The threshold value matrix creating method described in Supplement 1 wherein a repulsion potential is generated from the dot pattern of the aforementioned dot rate "b" and the pattern is reflected in the aforementioned error diffusion method, whereby interruption between patterns is minimized.

[Supplement 4]

The threshold value matrix creating method described in Supplement 3 wherein the range of the aforementioned repulsion potential can be adjusted by the dot density of the dot pattern.

[Supplement 5]

The value matrix creating method described in any one of the Supplements 1 through 4 wherein the dot pattern of the aforementioned dot rate "b" is the pattern formed by repeating the dot pattern having been determined previously to the previous phase, three times or more along the length and across the width.

[Supplement 6]

The value matrix creating method described in any one of the Supplements 1 through 5, further containing a process of creating an initial dot pattern.

[Supplement 7]

The threshold value matrix creating method described in Supplement 6 wherein the aforementioned initial dot pattern is error diffusion.

[Supplement 8]

The threshold value matrix creating method described in Supplement 7 wherein the aforementioned initial dot pattern represents a regular pattern.

[Supplement 9]

The threshold value matrix creating method described in Supplement 1 wherein the threshold value matrix is created from the highlight side.

[Supplement 10]

The threshold value matrix creating method described in Supplement 2 wherein the threshold value matrix is created from the shadow side.

[Supplement 11]

A threshold value matrix creating apparatus of creating the threshold value matrix for quantization of the input gradation value of the n-value in each pixel to m-value (n>m>1) using the dither process, wherein the aforementioned threshold value matrix determines the threshold value using the error diffusion method while increasing the output density, and the aforementioned error diffusion method generates a dot at the output pixel position having been determined previously.

[Supplement 12]

A threshold value matrix creating apparatus of creating the threshold value matrix for quantization of the input gradation value of the n-value in each pixel to m-value (n>m>1) using the dither process, wherein the aforementioned threshold value matrix determines the threshold value using the error diffusion method while decreasing the output density, and the aforementioned error diffusion method generates a dot by selection from the output pixel position having been determined previously.

[Supplement 13]

The threshold value matrix creating apparatus described in Supplement 11 wherein a repulsion potential is generated from the dot pattern of the aforementioned dot rate "b" and the pattern is reflected in the aforementioned error diffusion method, whereby interruption between patterns is minimized.

[Supplement 14]

The threshold value matrix creating apparatus described in Supplement 13 wherein the range of the aforementioned repulsion potential can be adjusted by the dot density of the dot pattern.

[Supplement 15]

The value matrix creating apparatus described in any one of the Supplements 11 through 14 wherein the dot pattern of the aforementioned dot rate "b" is the pattern formed by repeating the dot pattern having been determined previously to the previous phase, three times or more along the length and across the width.

[Supplement 16]

The value matrix creating apparatus described in any one of the Supplements 11 through 15, further containing a process of creating an initial dot pattern.

[Supplement 17]

The threshold value matrix creating apparatus described in Supplement 16 wherein the aforementioned initial dot pattern is an error diffusion.

[Supplement 18]

The threshold value matrix creating apparatus described in Supplement 17 wherein the aforementioned initial dot pattern represents a regular pattern.

[Supplement 19]

The threshold value matrix creating apparatus described in Supplement 11 wherein the threshold value matrix is created from the highlight side.

[Supplement 20]

The threshold value matrix creating apparatus described in Supplement 2 wherein the threshold value matrix is created from the shadow side.

[Supplement 21]

A threshold value matrix creating program of creating the threshold value matrix for quantization of the input gradation value of the n-value in each pixel to m-value (n>m>1) using the dither process, wherein the aforementioned threshold value matrix determines the threshold value using the error diffusion method while increasing the output density, and the aforementioned error diffusion method generates a dot at the output pixel position having been determined previously.

[Supplement 22]

A threshold value matrix creating program of creating the threshold value matrix for quantization of the input gradation value of the n-value in each pixel to m-value (n>m>1) using the dither process, wherein the aforementioned threshold value matrix determines the threshold value using the error diffusion method while decreasing the output density, and the aforementioned error diffusion method generates a dot by selection from the output pixel position having been determined previously.

[Supplement 23]

The threshold value matrix creating program described in Supplement 21 wherein a repulsion potential is generated from the dot pattern of the aforementioned dot rate "b " and the pattern is reflected in the aforementioned error diffusion method, whereby interruption between patterns is minimized.

[Supplement 24]

The threshold value matrix creating program described in Supplement 23 wherein the range of the aforementioned repulsion potential can be adjusted by the dot density of the dot pattern.

[Supplement 25]

The value matrix creating program described in any one of the Supplements 21 through 24 wherein the dot pattern of the aforementioned dot rate "b" is the pattern formed by repeating the dot pattern having been determined previously to the previous phase, three times or more along the length and across the width.

[Supplement 26]

The value matrix creating program described in any one of the Supplements 21 through 25, further containing a process of creating an initial dot pattern.

[Supplement 27]

The threshold value matrix creating program described in Supplement 26 wherein the aforementioned initial dot pattern is an error diffusion.

[Supplement 28]

The threshold value matrix creating program described in Supplement 27 wherein the aforementioned initial dot pattern represents a regular pattern.

[Supplement 29]

The threshold value matrix creating program described in Supplement 21 wherein the threshold value matrix is created from the highlight side.

[Supplement 30]

The threshold value matrix creating program described in Supplement 22 wherein the threshold value matrix is created from the shadow side.

[Supplement 31]

A quantization apparatus for quantizing the input gradation value of the n-value in each pixel to the m-value (n>m>1) using the threshold value matrix to ensure that the dot pattern corresponding to each output density will become the dot pattern generated in the error diffusion method.

The embodiments of the present invention provide the following advantages:

(1) In the first place, the initial dot pattern of a predetermined dot rate "a" is created in the first process, and the gradation value corresponding to the dot rate "a" is arranged as a threshold value in the position of the pixel of the threshold value matrix corresponding to this initial dot pattern. Then in the second process, the initial dot pattern or the dot pattern having occurred prior to the second computation is used as the dot pattern of dot rate "b", and a new dot including the dot of the dot pattern of dot rate "b" is generated or any of the dots is removed from the dot pattern of the dot rate "b" by the error diffusion method. Thus, the dot pattern of the next dot rate "b'" with its dot rate having been increased or decreased in the aforementioned procedure is generated. The gradation value corresponding to the dot rate "b'" is arranged as a threshold value at the pixel position of the threshold value matrix corresponding to the position wherein dots are produced or removed in this case. Further, this second process repeated for each dot rate, whereby a threshold value matrix is created, and the dot pattern of error diffusion can be obtained for each dot rate. Thus, a high-quality image is provided by using the threshold value matrix by this dot pattern. Further, compared with the conventional blue noise mask creation method, the creation process is made of the error diffusion alone. This arrangement reduces the creation time.

The connection among gradations is improved by creating the gradation value corresponding to each dot rate sequentially, and the next dot pattern is created by the error diffusion so as to include the dot pattern of the dot rate "b" having been determined already, whereby the interruption among dot patterns can be minimized.

Quantization by dither process i.e., processing of threshold value is carried out using the threshold value matrix created in the manner described above, whereby the dot pattern of error diffusion can be reproduced in each gradation area. In this case, when the signal of the n-value in each pixel is quantized into the m-value (n>m>1) using the dither process, high-speed image processing is possible because the dither process is employed. However, since the threshold value matrix is made by error diffusion, a high-quality image can be reproduced by the error diffusion method.

Further, if the threshold value matrix is created from the highlight side as a predetermined initial dot pattern, a high-quality image resulting from the initial dot pattern of error diffusion can be reproduced on the highlight side wherein dot diffusion stands out conspicuous If the threshold value matrix is created from the shadow side as a predetermined initial dot pattern, a high-quality image resulting from the initial dot pattern of error diffusion can be reproduced on the shadow side wherein the white dot diffusion stands out conspicuous against the black substrate.

If an intermediate value is adopted as a predetermined initial dot pattern and the threshold value matrix is created from the intermediate value toward the high- and low-density sides, a high-quality image resulting from the initial dot pattern of error diffusion can be reproduced on the halftone side wherein the dot rate is intermediate and the dot-to-substrate contrast stands out conspicuous.

The first embodiment of the present invention provides a threshold value matrix capable of producing a high-quality image with high halftone processing speed and uniform dot distribution.

(2) If a repulsion potential for each dot of the dot pattern of dot rate "b" is generated, a dot in the intended dot pattern cannot be easily produced in the vicinity of the dot having been generated already, when a new dot is to be generated. Further, the intended dot pattern cannot be easily removed in the vicinity of the dot having been generated already, when a dot is to be removed. This arrangement ensures further uniform dot distribution.

(3) When the range of the aforementioned repulsion potential can be adjusted by the density of the dot having been generated or removed, the optimum dot distribution can be obtained by dot density.

(4) The dot pattern of the dot rate "b" is formed by repeating one and the same dot pattern three times or more along the length and across the width, whereby interruption among dots in repeating the dot pattern can be minimized, and the threshold value matrix without pseudo contour can be created.

To be more specific, the dot pattern formed by repeating the pattern of one and the same threshold value matrix three times and more along the Length and across the width is used a reference pattern, thereby minimizing interruption among dots likely to occur at the connection in repeating the threshold value matrix.

(5) Further, the initial dot pattern is a dot pattern created by the error diffusion. This arrangement ensures a high-quality threshold value matrix to be created from the very beginning.

(6) In another embodiment of the present invention, the initial dot pattern of a predetermined dot rate "a" is created in the first computation process, and the gradation value corresponding to the dot rate "a" is arranged as a threshold value in the position of the pixel of the threshold value matrix corresponding to this initial dot pattern. Then in the second computation process, the initial dot pattern or the dot pattern having occurred prior to the second computation is used as the dot pattern of dot rate "b", and a new dot including the dot of the dot pattern of dot rate "b" is generated or any of the dots is removed from the dot pattern of the dot rate "b" Thus, the dot pattern of the next dot rate "b'" with its dot rate having been increased or decreased in the aforementioned procedure is generated. The gradation value corresponding to the dot rate "b'" is arranged as a threshold value at the pixel position of the threshold value matrix corresponding to the position wherein dots are produced or removed in this case. Further, this second computation process is repeated for each dot rate, whereby a threshold value matrix is created, and hence the dot pattern of error diffusion can be obtained for each dot rate. Thus, a high-quality image is provided by using the threshold value matrix by this dot pattern. Further, compared with the conventional blue noise mask creation method, the computation process for creation is made of the error diffusion alone. This arrangement reduces the creation time.

The connection among gradations is improved by creating the gradation value corresponding to each dot rate sequentially, and the next dot pattern is created by the error diffusion so as to include the dot pattern of the dot rate "b" having been determined already, whereby the interruption among dot patterns can be minimized.

Quantization by dither process, i.e., processing of threshold value is carried out using the threshold value matrix created in the manner described above, whereby the dot pattern of error diffusion can be reproduced in each gradation area. In this case, when the signal of the n-value in each pixel is quantized into the m-value (n>m>1) using the dither process, high-speed image processing is possible because the dither process is employed. However, since the threshold value matrix is made by error diffusion, a high-quality image can be reproduced by the error diffusion method.

Further, if the threshold value matrix is created from the highlight side as a predetermined initial dot pattern, a high-quality image resulting from the initial dot pattern of error diffusion can be reproduced on the highlight side wherein dot diffusion stands out conspicuous.

If the threshold value matrix is created from the shadow side as a predetermined initial dot pattern, a high-quality image resulting from the initial dot pattern of error diffusion can be reproduced on the shadow side wherein the white dot diffusion stands out conspicuous against the black substrate.

If an intermediate value is adopted as a predetermined initial dot pattern and the threshold value matrix is created from the intermediate value toward the high- and low-density sides, a high-quality image resulting from the initial dot pattern of error diffusion can be reproduced on the halftone side wherein the dot rate is intermediate and the dot-to-substrate contrast stands out conspicuous.

The present embodiment of the present invention provides a threshold value matrix capable of producing a high-quality image with high halftone processing speed and uniform dot distribution.

(7) If a repulsion potential for each dot of the dot pattern of dot rate "b" is generated, a dot in the intended dot pattern cannot be easily produced in the vicinity of the dot having been generated already, when a new dot is to be generated. Further, the intended dot pattern cannot be easily removed in the vicinity of the dot having been generated already, when a dot is to be removed. This arrangement ensures further uniform dot distribution.

(8) When the range of the aforementioned repulsion potential can be adjusted by the density of the dot having been generated or removed, the optimum dot distribution can be obtained by dot density.

(9) The dot pattern of the dot rate "b" is formed by repeating one and the same dot pattern three times or more along the length and across the width, whereby interruption among dots in repeating the dot pattern can be minimized, and the threshold value matrix without pseudo contour can be created.

To be more specific, the dot pattern formed by repeating the pattern of one and the same threshold value matrix three times and more along the length and across the width is used a reference pattern, thereby minimizing interruption among dots likely to occur at the connection in repeating the threshold value matrix.

(10) Further, the initial dot pattern is a dot pattern created by the error diffusion. This arrangement ensures a high-quality threshold value matrix to be created from the very beginning.

(11) In still another embodiment of the present invention, the initial dot pattern of a predetermined dot rate "a" is created in the first computation process, and the gradation value corresponding to the dot rate "a" is arranged as a threshold value in the position of the pixel of the threshold value matrix corresponding to this initial dot pattern. Then in the second computation process, the initial dot pattern or the dot pattern having occurred prior to the second computation is used as the dot pattern of dot rate "b", and a new dot including the dot of the dot pattern of dot rate "b" is generated or any of the dots is removed from the dot pattern of the dot rate "b". Thus, the dot pattern of the next dot rate "b'" with its dot rate having been increased or decreased in the aforementioned procedure is generated. The gradation value corresponding to the dot rate "b'" is arranged as a threshold value at the pixel position of the threshold value matrix corresponding to the position wherein dots are produced or removed in this case. Further, this second computation process is repeated for each dot rate, whereby a threshold value matrix is created, and hence the dot pattern of error diffusion can be obtained for each dot rate. Thus, a high-quality image is provided by using the threshold value matrix by this dot pattern. Further, compared with the conventional blue noise mask creation method, the computation process for creation is made of the error diffusion alone. This arrangement reduces the creation time.

The connection among gradations is improved by creating the gradation value corresponding to each dot rate sequentially, and the next dot pattern is created by the error diffusion so as to include the dot pattern of the dot rate "b" having been determined already, whereby the interruption among dot patterns can be minimized.

Quantization by dither process, i.e., processing of threshold value is carried out using the threshold value matrix created in the manner described above, whereby the dot pattern of error diffusion can be reproduced in each gradation area. In this case, when the signal of the n-value in each pixel is quantized into the m-value (n>m>1) using the dither process, high-speed image processing is possible because the dither process is employed. However, since the threshold value matrix is made by error diffusion, a high-quality image can be reproduced by the error diffusion method.

Further, if the threshold value matrix is created from the highlight side as a predetermined initial dot pattern, a high-quality image resulting from the initial dot pattern of error diffusion can be reproduced on the highlight side wherein dot diffusion stands out conspicuous.

If the threshold value matrix is created from the shadow side as a predetermined initial dot pattern, a high-quality image resulting from the initial dot pattern of error diffusion can be reproduced on the shadow side wherein the white dot diffusion stands out conspicuous against the black substrate.

If an intermediate value is adopted as a predetermined initial dot pattern and the threshold value matrix is created from the intermediate value toward the high- and low-density sides, a high-quality image resulting from the initial dot pattern of error diffusion can be reproduced on the halftone side wherein the dot rate is intermediate and the dot-to-substrate contrast stands out conspicuous.

The present embodiment of the present invention provides a threshold value matrix capable of producing a high-quality image with high halftone processing speed and uniform dot distribution.

(12) If a repulsion potential for each dot of the dot pattern of dot rate "b" is generated, a dot in the intended dot pattern cannot be easily produced in the vicinity of the dot having been generated already, when a new dot is to be generated. Further, the intended dot pattern cannot be easily removed in the vicinity of the dot having been generated already, when a dot is to be removed. This arrangement ensures further uniform dot distribution.

(13) When the range of the aforementioned repulsion potential can be adjusted by the density of the dot having been generated or removed, the optimum dot distribution can be obtained by dot density.

(14) The dot pattern of the dot rate "b" is formed by repeating one and the same dot pattern three times or more along the length and across the width, whereby interrupt on among dots in repeating the dot pattern can be minimized, and the threshold value matrix without pseudo contour can be created.

To be more specific, the dot pattern formed by repeating the pattern of one and the same threshold value matrix three times and more along the length and across the width is used a reference pattern, thereby minimizing interruption among dots likely to occur at the connection in repeating the threshold value matrix.

(15) Further, the initial dot pattern is a dot pattern created by the error diffusion. This arrangement ensures a high-quality threshold value matrix to be created from the very beginning.

What is claimed is:

1. A method of operating a computation device to process an image using a threshold value matrix for quantization of an n-value signal in each pixel of the image into an m-value (n>m>1) using a dither process, the method comprising:
   (i) creating the threshold value matrix by:
   executing a first process of creating an initial dot pattern of a predetermined dot rate "a" and arranging a gradation value corresponding to the dot rate "a" at a pixel position of the threshold value matrix, the pixel position corresponding to the initial dot pattern, as a threshold value;
   executing a second process so as to generate a dot pattern of dot rate "b'" having a gradation value g+δg based on a reference pattern of dot rate "b" having a gradation value g, said second process comprising the steps of:
   a) calculating a total obtained by adding peripheral error to an input value of the gradation value of g+δg;
   b) determining whether or not a dot has already occurred at a position of a pixel of interest in the dot pattern of dot rate "b";
   c) when it is determined that a dot has already occurred in step b), adding a dot to a pixel of interest in the dot pattern of dot rate "b'", substituting a first value as an evaluation value, finding an error between the total and the evaluation value, and diffusing the error to an unprocessed peripheral pixel;
   d) when it is determined that no dot has occurred in step b), comparing the total with a threshold value, adding a dot to the pixel of interest in the dot pattern of dot rate "b'" when the total is greater as a result of the comparison, substituting the first value as an evaluation value, turning off a dot at the pixel of interest in the dot pattern of dot rate "b'" when the total is not greater as a result of the comparison, substituting a second value as a result of the comparison, calculating an error between the evaluation value and the total, and diffusing the error to an unprocessed peripheral pixel; and
   e) replacing the threshold value at a position of a pixel of a newly produced dot by gradation value g+δg that corresponds to dot rate dot rate "b'";
   (ii) processing the image using the created threshold value matrix.

2. The method of claim 1, wherein creating the threshold value matrix further comprises generating a repulsion potential for each dot of the dot pattern of the dot rate "b", so that new dots of the dot pattern of dot rate "b'" cannot be easily produced in a vicinity of an already generated dot and so that the dots of the dot pattern of dot rate "b'" cannot be easily removed immediately after in a vicinity of an already removed dot.

3. The method of claim 2, wherein a range of the repulsion potential is adjustable by a density of the dots having been generated or removed.

4. The method of claim 1, wherein the dot pattern of the dot rate "b" is formed by repeating one and the same dot pattern at least three times along a length and across a width.

5. The method of claim 1, wherein the initial dot pattern is created by an error diffusion method.

6. An image processing apparatus for processing an image using a threshold value matrix for quantization of an n-value signal in each pixel of the image into an m-value (n>m>1) using a dither process, the apparatus comprising:
   (i) a computing section which creates the threshold value matrix by:
   executing a first process of creating an initial dot pattern of a predetermined dot rate "a" and arranging a gradation value corresponding to the dot rate "a" at a pixel position of the threshold value matrix, the pixel position corresponding to the initial dot pattern, as a threshold value;
   executing a second process so as to generate a dot pattern of dot rate "b'" having a gradation value g+δg based on a reference pattern of dot rate "b" having a gradation value g, said second process comprising the steps of:
   a) calculating a total obtained by adding peripheral error to an input value of the gradation value of g+δg;

b) determining whether or not a dot has already occurred at a position of a pixel of interest in the dot pattern of dot rate "b";

c) when it is determined that a dot has already occurred in step b), adding a dot to a pixel of interest in the dot pattern of dot rate "b'", substituting a first value as an evaluation value, finding an error between the total and the evaluation value, and diffusing the error to an unprocessed peripheral pixel;

d) when it is determined that no dot has occurred in step b), comparing the total with a threshold value, adding a dot to the pixel of interest in the dot pattern of dot rate "b'" when the total is greater as a result of the comparison, substituting the first value as an evaluation value, turning off a dot at the pixel of interest in the dot pattern of dot rate "b'" when the total is not greater as a result of the comparison, substituting a second value as a result of the comparison, calculating an error between the evaluation value and the total, and diffusing the error to an unprocessed peripheral pixel; and e) replacing the threshold value at a position of a pixel of a newly produced dot by gradation value g+δg that corresponds to dot rate dot rate "b'";

(ii) a control section which processes the image using the created threshold value matrix.

7. The image processing apparatus of claim 6, wherein computation device further generates a repulsion potential for each dot of the dot pattern of the dot rate "b", so that new dots of the dot pattern of dot rate "b'" cannot be easily produced in a vicinity of an already generated dot and so that the dots of the dot pattern of dot rate "b'" cannot be easily removed immediately after in a vicinity of an already removed dot.

8. The image processing apparatus of claim 7, wherein a range of the repulsion potential is adjustable by a density of the dots having been generated or removed.

9. The image processing apparatus of claim 6, wherein the dot pattern of the dot rate "b" is formed by repeating one and the same dot pattern at least three times along a length and across a width.

10. The image processing apparatus of claim 6, wherein the initial dot pattern is created by an error diffusion method.

11. A non-transitory computer readable medium having a program stored thereon for controlling a computation device to process an image using a threshold value matrix for quantization of an n-value signal in each pixel of the image into an m-value (n>m>1) using a dither process, wherein the program controls the computation device to perform a method comprising:

(i) creating the threshold value matrix by:

executing a first process of creating an initial dot pattern of a predetermined dot rate "a" and arranging a gradation value corresponding to the dot rate "a" at a pixel position of the threshold value matrix, the pixel position corresponding to the initial dot pattern, as a threshold value;

executing a second process so as to generate a dot pattern of dot rate "b" having a gradation value g+δg based on a reference pattern of dot rate "b" having a gradation value g, said second process comprising the steps of:

a) calculating a total obtained by adding peripheral error to an input value of the gradation value of g+δg;

b) determining whether or not a dot has already occurred at a position of a pixel of interest in the dot pattern of dot rate "b";

c) when it is determined that a dot has already occurred in step b), adding a dot to a pixel of interest in the dot pattern of dot rate "b'", substituting a first value as an evaluation value, finding an error between the total and the evaluation value, and diffusing the error to an unprocessed peripheral pixel;

d) when it is determined that no dot has occurred in step b), comparing the total with a threshold value, adding a dot to the pixel of interest in the dot pattern of dot rate "b'" when the total is greater as a result of the comparison, substituting the first value as an evaluation value, turning off a dot at the pixel of interest in the dot pattern of dot rate "b'" when the total is not greater as a result of the comparison, substituting a second value as a result of the comparison, calculating an error between the evaluation value and the total, and diffusing the error to an unprocessed peripheral pixel; and e) replacing the threshold value at a position of a pixel of a newly produced dot by gradation value g+δg that corresponds to dot rate dot rate "b'";

(ii) processing the image using the created threshold value matrix.

12. The computer readable medium of claim 11, wherein creating the threshold value matrix further comprises generating a repulsion potential for each dot of the dot pattern of the dot rate "b", so that new dots of the dot pattern of dot rate "b'" cannot be easily produced in a vicinity of an already generated dot and so that the dots of the dot pattern of dot rate "b'" cannot be easily removed immediately after in a vicinity of an already removed dot.

13. The computer readable medium of claim 12, wherein a range of the repulsion potential is adjustable by a density of the dots having been generated or removed.

14. The computer readable medium of claim 11, wherein the dot pattern of the dot rate "b" is formed by repeating one and the same dot pattern at least three times along a length and across a width.

15. The computer readable medium of claim 11, wherein the initial dot pattern is created by an error diffusion method.

* * * * *